(12) United States Patent
Gordon

(10) Patent No.: US 6,659,619 B2
(45) Date of Patent: Dec. 9, 2003

(54) LUMINESCENT LOLLIPOP

(76) Inventor: J. Paul Gordon, c/o SimpleLogic Inc., 354 Davenport Road, Suite 3A, Toronto, Ontario (CA), M5R 1K6

(*) Notice: Subject to any disclaimer, the term of this patent is extended or adjusted under 35 U.S.C. 154(b) by 0 days.

(21) Appl. No.: 10/090,811

(22) Filed: Mar. 6, 2002

(65) Prior Publication Data

US 2002/0126507 A1 Sep. 12, 2002

Related U.S. Application Data

(60) Provisional application No. 60/273,333, filed on Mar. 6, 2001.

(51) Int. Cl.[7] ............................................. F21V 33/00
(52) U.S. Cl. ........................ 362/109; 362/188; 362/577; 362/253
(58) Field of Search ................................ 362/109, 253, 362/577; 443/71, 73; 426/134

(56) References Cited

U.S. PATENT DOCUMENTS

| | | | |
|---|---|---|---|
| 4,231,077 A | * 10/1980 | Joyce et al. ................ 362/577 |
| 4,914,748 A | 4/1990 | Schlotter, IV et al. | |
| 5,471,373 A | 11/1995 | Coleman et al. | |
| 5,560,705 A | * 10/1996 | Shiau ........................... 362/188 |
| 5,615,941 A | 4/1997 | Shecter | |
| 5,676,988 A | 10/1997 | Coleman et al. | |
| 5,733,033 A | 3/1998 | Coleman et al. | |
| 5,860,732 A | 1/1999 | Coleman et al. | |
| 5,921,841 A | 7/1999 | Coleman et al. | |
| 6,050,697 A | 4/2000 | Bennington | |
| 6,062,936 A | 5/2000 | Rudell et al. | |
| 6,077,144 A | 6/2000 | Fishman | |
| 6,135,606 A | * 10/2000 | Fernandez et al. ........... 362/109 |
| 6,190,225 B1 | 2/2001 | Coleman et al. | |
| 6,231,415 B1 | 5/2001 | Coleman et al. | |
| 6,273,580 B1 | 8/2001 | Coleman et al. | |

FOREIGN PATENT DOCUMENTS

FR      2744336      8/1997

* cited by examiner

*Primary Examiner*—Sandra O'Shea
*Assistant Examiner*—James W Cranson, Jr.
(74) *Attorney, Agent, or Firm*—Ridout & Maybee LLP

(57) ABSTRACT

An apparatus for making a candy, such as a lollipop, luminescent has a transparent or translucent candy; a handle containing a light source; and a light transmitting shaft having a candy end and a handle end, the candy end extendable into the candy and the handle end extendable to the handle; wherein when assembled, the light source can transmit light along the shaft from the handle end to the candy end, into the candy and outwards from the candy.

20 Claims, 3 Drawing Sheets

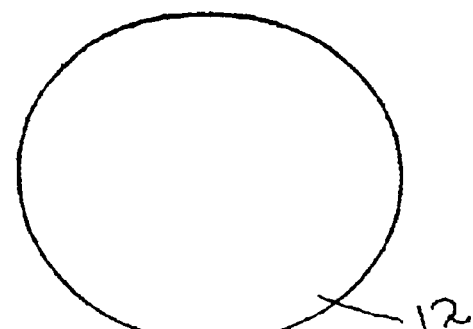
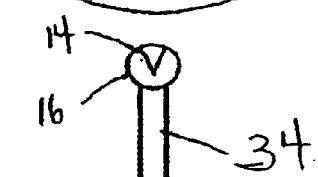
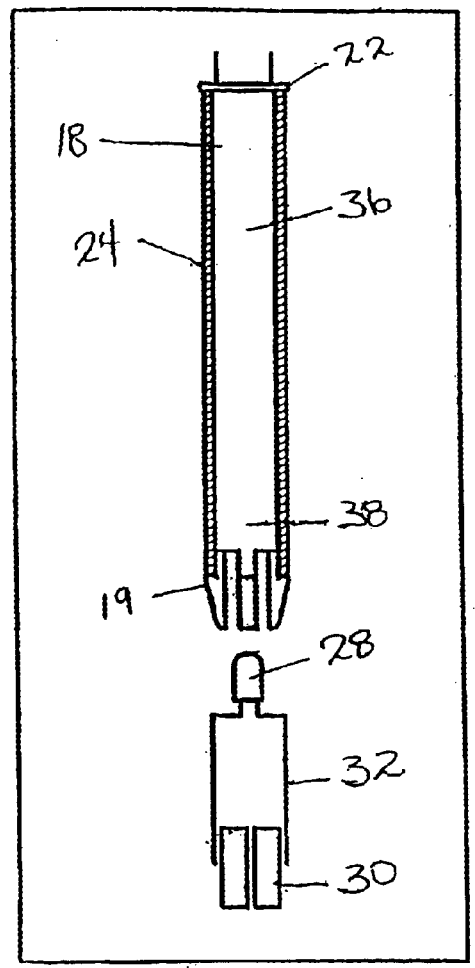

LUMINESCENT LOLLIPOP

CROSS-REFERENCE TO RELATED APPLICATIONS

This application claims priority from a U.S. patent application Ser. No. 60/273,333, filed Mar. 6, 2001, entitled LUMINESCENT LOLLIPOP, which is pending.

FIELD OF THE INVENTION

This invention is directed to the field of consumable candies which can be illuminated.

BACKGROUND OF THE INVENTION

Lights have been used in many different ways to illuminate candy, such as lollipops. U.S. Pat. No. 5,471,373 (Coleman et al) discloses an apparatus for projecting a flashing light which reflects off of the surface of a candy. U.S. Pat. No. 5,615,941 (Shecter) discloses a dual lollipop holder and storage device having a lollipop compartment at both ends. The lollipop holder optionally includes a lighting mechanism for projecting light through an aperture in the storage device. U.S. Pat. No. 5,676,988 (Coleman et al) discloses a lollipop attached to a housing including a toy creature inside. The housing also includes bulbs for illuminating the toy creature. U.S. Pat. No. 5,733,033 (Coleman et al) discloses a candy holding device in combination with a sound making device and a light device for flashing a light in time to sounds made by the sound making device. The light projects from the end opposite the candy holder end. U.S. Pat. No. 6,077,144 (Fishman) discloses a candy holder that uses a light to display a random message on the candy holder in response to a movement of the candy.

U.S. Pat. No. 6,050,697 (Bennington) discloses an illuminated candy holder. The illuminated candy holder includes a light, an image generator, and an open end through which an image is generated when the light shines through the image generator. A candy can be attached to the open end of the candy holder. Removal of the candy piece (usually by eating) allows the image to be seen.

Two patents appear to disclose candy holders that illuminate a candy by shining through the candy. Specifically, U.S. Pat. No. 4,914,748 (Schlotter et al) discloses the combination of a flashlight and a transparent or translucent piece of candy. The flashlight has a clear, flat lens adjacent to the candy portion, through which light is projected into and through the candy.

U.S. Pat. No. 6,062,936 (Rudell et al) discloses a candy holder for holding a transparent or translucent candy, through which light is emitted. The candy holder includes a light positioned to project light into the translucent candy.

PCT Publication No. WO 0024485 (Buschle Neto Ewaldo Antonio) discloses a lighted lollipop toy comprising a triggering device, a grip, a lollipop or other kind of candy in a lid. This lollipop contemplated in this invention do not have a stem but rather attached directly to the grip.

French Patent Publication No. FR 2744336 (Rosa Joseph Di) teaches a lollipop mounted on a hollow stick. At a top of the stick is a bulb connected by wires or other conductors to a battery in a circuit with a switch at the base of the stem. The stick must be insulated to protect the user from electrical shock.

SUMMARY OF THE INVENTION

The present invention provides an apparatus for making a candy, such as a lollipop, luminescent has a transparent or translucent candy; a handle containing a light source; and a light transmitting shaft having a candy end and a handle end, the candy end extendable into the candy and the handle end extendable to the handle; wherein when assembled, the light source can transmit light along the shaft from the handle end to the candy end, into the candy and outwards from the candy.

The handle may have a sleeve projecting upwards therefrom, the sleeve configured to receive said shaft. The shaft may be hollow, transparent, or translucent.

There may be a reflector in the candy end of the shaft. The reflector may be a cone. The candy may act as a reflector.

There may be a retainer on the candy end of the shaft. There may be a fastener at the handle end of the shaft.

There may be a switch for controlling the emission of light from the light source. The switch may be manually operated. The switch may automatically and intermittently emit light from the light source. The switch may be pressure sensitive and configured to emit light from the light source upon applying pressure to the shaft. The light source may be an LED.

BRIEF DESCRIPTION OF THE DRAWINGS

A preferred embodiment of the invention will be described with reference to the accompanying drawings, in which:

FIG. 1 is an exploded cross-section view of an apparatus of the present invention with a piece of candy; and FIG. 2 is a detail cross-section view of a handle of FIG. 1.

DETAILED DESCRIPTION OF EMBODIMENTS

Figure 3:
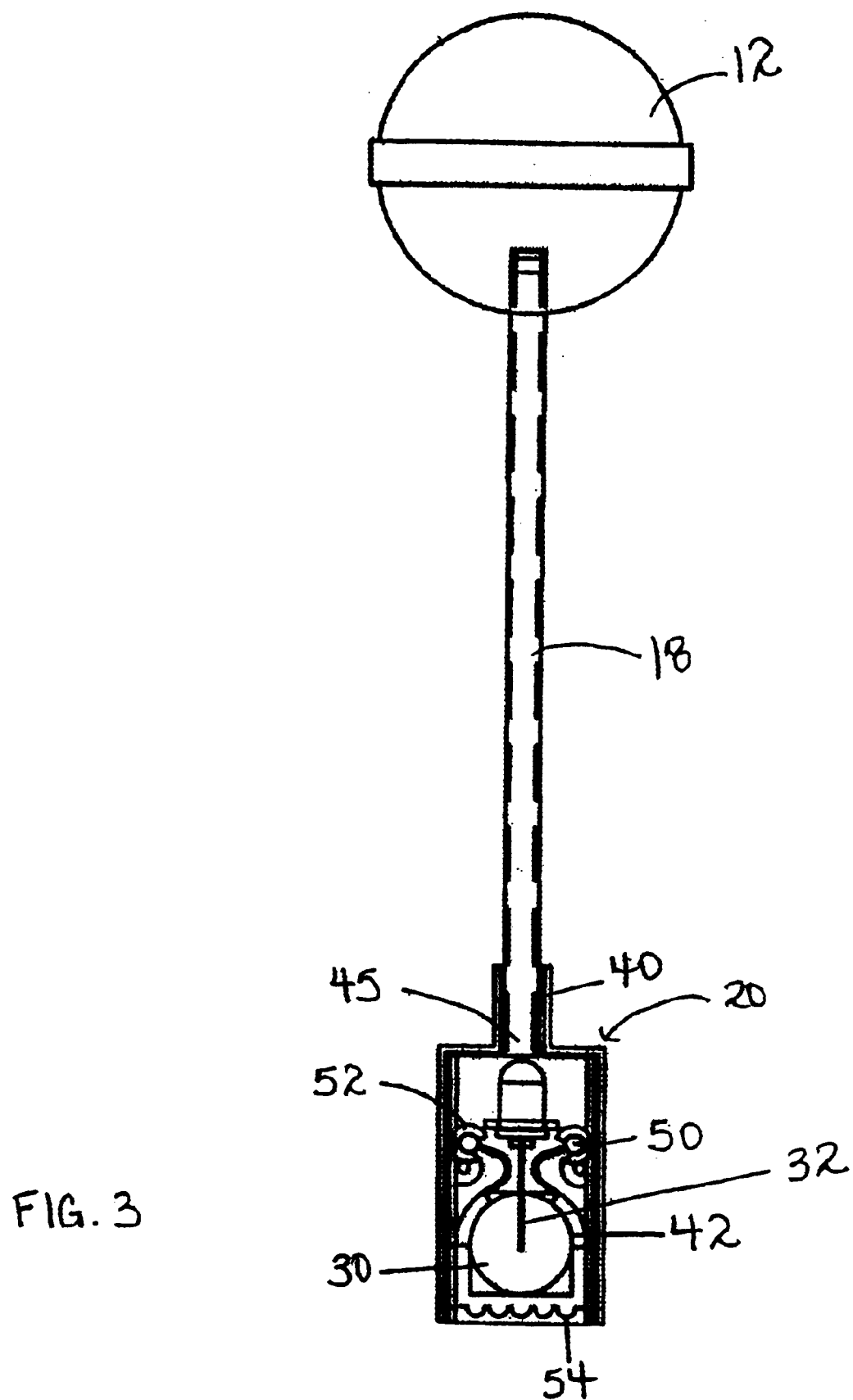
FIG. 3. is a detailed cross-section view of a further embodiment of the invention.

The luminescent candy apparatus of the present invention includes a candy, a handle, and a shaft. A power source and a light source are located in the handle. The candy is on one end of the shaft, and the other end of the shaft is inserted into the handle. The light source is directed into the shaft. The shaft is hollow or is made of a light-transmitting plastic that transmits the light upwardly from the light source into the candy ball attached to the opposite end of the shaft. The candy ball may be retained on the end of the handle by a spherical candy retainer of larger diameter than the handle. Alternatively, the candy may be retained on the end of the handle by notching the handle and forming the candy over the handle. Light from the shaft is directed toward the candy end of the shaft and is then reflected into the interior of the candy ball. The candy ball is itself transparent or translucent so that the light shines through the candy ball and is visible outside of the candy ball.

Referring to FIGS. 1 and 2, there is shown an exploded view of the operational components of an illuminated candy device made in accordance with the invention. As shown, the illuminated candy apparatus (10) includes a handle (20) for the consumer to hold and for housing a power source (30), which may be at least one battery. A 3 volt current may be suitable. Power source (30) supplies a current to a light (28) via an electrical circuit (32) extending from the light to the power source (30) and back to complete the circuit. The light in the embodiment shown is an LED (light emitting diode), which is inexpensive, requires relatively little energy and provides a strong light source with minimal heat generated.

A switch (not shown) may be placed in the electrical circuit. The power source may be supported in a reflector (31) having a reflective surface toward the open end (38) of tube (24) which is sized to hold shaft (18). Power source (30), light (28), tube (24) and the handle end (36) of shaft (18) are housed in the handle (20).

Shaft (18) may be clear plastic or any other non-toxic light transmitting material. For example, shaft (18) can be a 3 to 5 mm diameter plastic tube made of Lexan™, grade 124. Shaft (18) may be a opaque hollow tube, or may be a hollow or solid translucent or transparent tube, so long as it is light transmitting. Shaft (18) may be molded or may be formed by straight extrusion. Shaft (18) may be colored, for example with 111 Clear Blue. Handle end (36) of shaft (18) is secured in handle (20). In the embodiment shown, tube (24) has arrow head clip retainers to releasably lock tube (24) to the lower end of handle (20). Retaining means known in the art can be used to secure shaft (18) to handle (20), for example, ribs, a threaded screw, a clamp or a pin.

At the opposite, candy end (34) of shaft (18), the shaft terminates in a retainer (16). In the embodiment shown, retainer (16) is a bulb which secures candy (12) to the shaft by an interference fit. As shown, retainer (16) may be a bulbous shape. In other embodiments, (not shown) the retainer may be other shapes, such as a disc or a square, a logo, an animal shape, an ornamental design, or a notch in the shaft, and the retainer does not necessarily have to be located at the very end of the shaft, so long as it retains candy 12 to the shaft. Alternatively, the candy may be retained by it natural adhesive properties when it is formed on the shaft.

Candy (12) is formed with retainer (16) in the middle of the candy, and shaft (18)projecting therefrom. Retainer (16) is formed using any non-toxic material which is capable of transmitting light. For example, retainer (16) may be formed using the same material used for shaft (18). Retainer (16) may be formed continuous with shaft (18). Alternatively, the retainer (16) may be a notch or indentation in shaft (18).

In an embodiment of the invention, retainer (16) or another part of the candy end (34) of shaft (18) contains a reflector (14). Reflector (14) reflects light received from shaft (18) in various directions, for example, perpendicular to shaft (18). In the embodiment shown, reflector (14) is a cone shape, with the narrow end of the cone pointed towards the light source (28). This reflective cone reflects the light received from the handle in a direction substantially perpendicular to the handle. It will be appreciated that other shapes may be used for reflector (14). Reflector (14) may be made from any non-toxic material capable of reflecting light, for example, frosted plastic. In other embodiments (not shown), various shapes and sizes of reflector may be used, or, where the candy is translucent, no reflector is required.

In assembling the apparatus, a piece of transparent or translucent candy (12) is secured to the retainer 16. Handle end (36) of the shaft (18) is then inserted into the tube (24) of handle (20). This step may be performed by the consumer. When shaft (18) is inserted far enough into the tube (24), it is engaged by a fastener (19). Fastener (19) may be configured to allow it to release shaft (18) from the handle, where it is desirable to insert replacement candy after the first candy has been consumed. Fastener (19) may be, for example, ribs, a threaded screw, a clamp or a pin.

Figure 4:
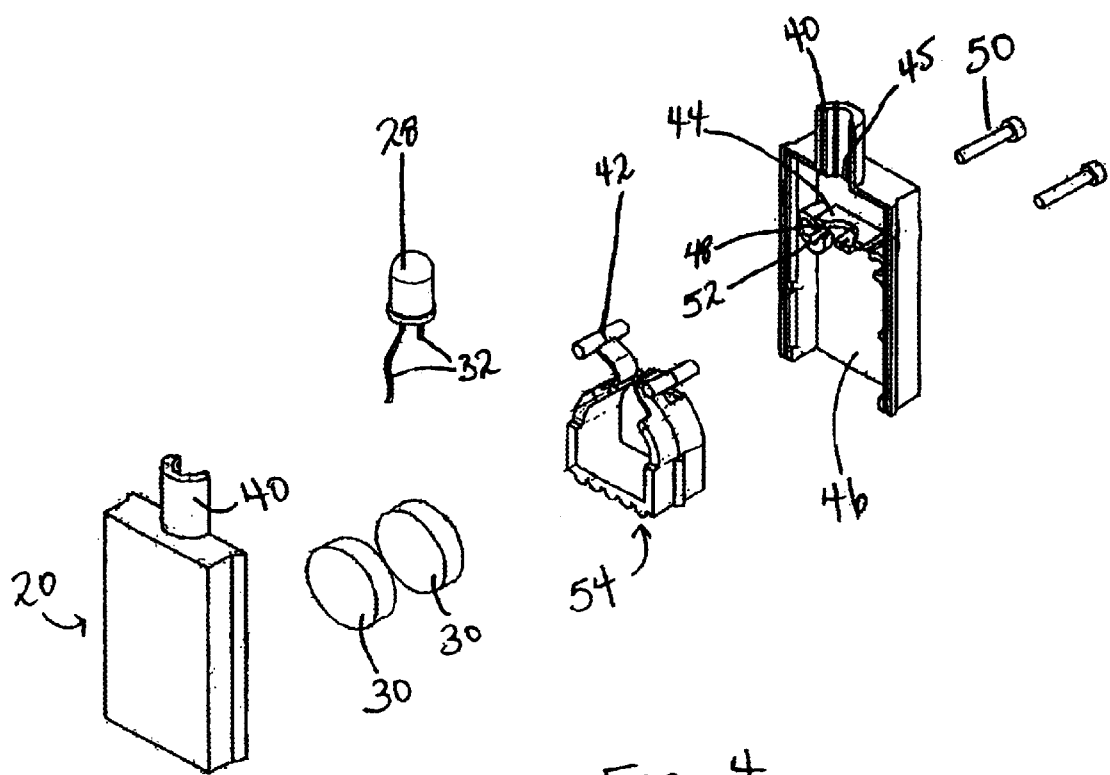
FIG. 4. is an exploded perspective view of the handle of FIG. 3.

In another embodiment, shown at FIGS. 3 and 4, sleeve (40) performs much the same function as tube 24 in the earlier described embodiment. Sleeve (40) may vary in height. For example, it may extend half way up the length of shaft (18) or it may extend the entire length of shaft (18). The base of sleeve (40) may be ribbed on its inside diameter, or it may have another form of friction fit to facilitate releasably securing shaft (18) within the sleeve (40). A stop (45) prevents shaft (18) from extending too far into the handle (20). Stop (45) is configured so as not to prevent light from traveling from the handle (20) to the shaft (18).

FIG. 3 and FIG. 4 shown internal structural detail, including assembly (42) which is configured to retain batteries (30). The batteries may be, for example, silver oxide button cell batteries no. SG-10, 1.5 V, 10% Silver SR54 or other energy providing means known in the art. As shown in FIG. 4, rim (44) projects outwards from interior wall (46) of handle (20), and is configured with a concave shape (48) for receiving light (28). A similarly configured and opposing rim (not shown) is located on the opposite half of handle (20), so that the opposing concave surfaces serve to secure light (28). Bolts (50) project through receptacles (52) to fasten the sides of the handle together to secure the inner parts described above. The bolts may be, for example, 8 mm a based PT screws or other attaching means known in the art. Assembly (42) includes a bottom (54).

Handle (20) may serve as an internal handle piece, and outer designs, toys or handles can be configured to receive handle (20) therewithin. Similarly, a toy or decorative outer handle can be molded over handle (20).

The handle and candy may be of any desired shape. The transparent or translucent candy may be hard such as a lollipop or sucker. The candy may be covered by a protective covering which is removable. The handle housing may be made of any durable material which may be formed or molded into any desired shape such as cylindrical. If the device is to be used by children, the device should have no sharp features. It should be of a breakage resistant material and non toxic. The handle (20) can be sealed by any suitable means such as screws, bolts, epoxy or an adhesive.

The device is shown with two small batteries. Any number of batteries and any desired size battery may be used. However, if the device is to be made so that the batteries are not replaceable, the batteries should be operable over a useful period of time. The switch may be a slide switch, a push on-off switch or a contact switch which only completes the circuit while being pushed to make contact with a circuit completing contact. If a switch of the latter type is used, a user such as a small child will not leave the light on while not being held or in use. The candy can be illuminated on pressing a switch, or, alternatively, the candy is illuminated when the user licks the candy, by means of a pressure sensor connected to the switch.

By using either a candy, a light, or a shaft of different colors, the light beams shining therethrough can be aligned with the different colored candies and different colored light will be seen in the candy.

The above description with reference to the illustrations is considered to be illustrative and not restrictive in character. The true scope and spirit of the invention resides in the appended claims and their legal equivalents, rather than by the given examples. Modifications and variations on the embodiments described or known to those skilled in the art may be made within the scope of the invention.

I claim:

1. A luminescent candy apparatus comprising:
    a transparent or translucent candy;
    a handle containing a light source;
    a light transmitting shaft having a candy end and a handle end, said candy end extendable into said candy and said handle end extendable to said handle and removable from said handle;

wherein when assembled, said light source can transmit light along said shaft from said handle end to said candy end.

2. An apparatus as claimed in claim 1 wherein, said handle further comprises a sleeve projecting upwards therefrom, said sleeve configured to receive said shaft.

3. An apparatus as claimed in claim 1, further comprising a reflect at said candy end of said shaft.

4. An apparatus as claimed in claim 1, further comprising a retainer at said candy end of said shaft.

5. An apparatus as claimed in claim 1, further comprising a fastener at said handle end of said shaft.

6. An apparatus as claimed to claim 2, wherein said sleeve is configured to provide a friction fit for said shaft.

7. An apparatus as claimed in claim 5, wherein said fastener comprises screw threads on said handle end, and said handle has screw threads on an inner surface of said handle.

8. An apparatus as claimed in claim 1, further comprising a reflector at the light source.

9. A luminescent candy apparatus comprising:

a transparent or translucent candy;

a handle containing a light source;

a light transmitting shaft having a candy end and a handle end, wherein said shaft is translucent and said candy end extendable into said candy and said handle end extendable to said handle;

wherein when assembled, said light source can transmit light along said shaft from said handle end to said candy end.

10. An apparatus as claimed in claim 9 wherein, said handle further comprises a sleeve projecting upwards therefrom, said sleeve configured to receive said shaft.

11. An apparatus as claimed in claim 9, further comprising a retainer at said candy end of said shaft.

12. An apparatus as claimed in claim 9, further comprising a removable fastener at said handle end of said shaft.

13. An apparatus as claimed in claim 10, wherein said sleeve is configured to provide a friction fit for said shaft.

14. An apparatus as claimed in claim 10, wherein said sleeve is configured to project substantially the entire length of said light source.

15. A luminescent candy apparatus comprising:

a transparent or translucent candy;

a handle containing a light source;

a light transmitting shaft having a candy end and a handle end, wherein
said shaft is opaque and said candy end extendable into said candy and
said handle end extendable to said handle;

wherein when assembled, said light source can transmit light along said shaft from said handle end to said candy end.

16. An apparatus as claimed in claim 15 wherein, said handle further comprises a sleeve projecting upwards therefrom, said sleeve configured to receive said shaft.

17. An apparatus as claimed in claim 15, further comprising a removable retainer at said candy end of said shaft.

18. An apparatus as claimed in claim 16, wherein said sleeve is configured to provide a friction fit for said shaft.

19. An apparatus as claimed in claim 15, further comprising a fastener at said handle end of said shaft.

20. An apparatus as claimed in claim 1, wherein said light transmitting shaft is a light pipe.

* * * * *